No. 620,314. Patented Feb. 28, 1899.
E. P. L. HARDY.
VALVE FOR PNEUMATIC TIRES.
(Application filed Mar. 14, 1898.)
(No Model.)
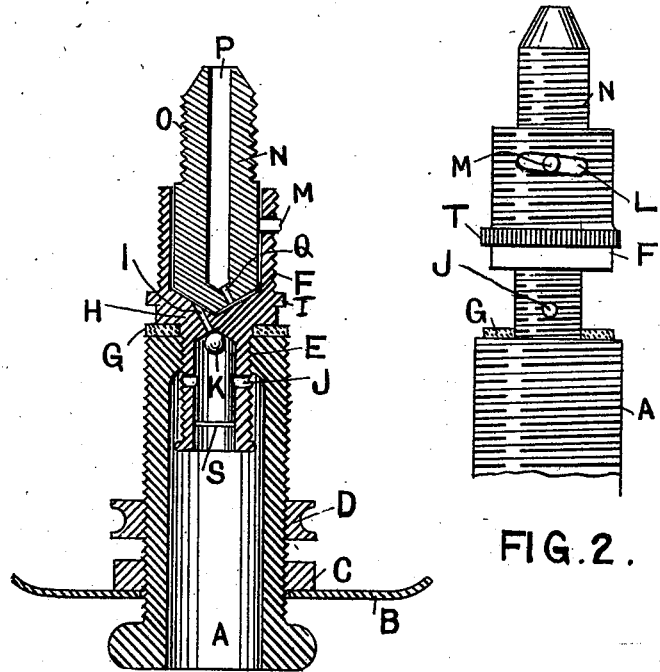

UNITED STATES PATENT OFFICE.

ERNEST P. L. HARDY, OF LIVERPOOL, ENGLAND.

VALVE FOR PNEUMATIC TIRES.

SPECIFICATION forming part of Letters Patent No. 620,314, dated February 28, 1899.

Application filed March 14, 1898. Serial No. 673,730. (No model.)

*To all whom it may concern:*

Be it known that I, ERNEST PASQUALE LEONE HARDY, a subject of the King of Italy, residing at Liverpool, in the county of Lancaster, England, have invented certain new and useful Improvements in Valves for Pneumatic Tires, (for which I have received a provisional patent in England, dated August 17, 1897, No. 19,036,) of which the following is a specification.

This invention has for its object an inflation-valve for pneumatic tires and the like which shall be an improvement on what has gone before.

Among the advantages of this invention are the following: The tire can be deflated without it being necessary to take off the cap or to take the valve asunder. Even if the cap be off, the valve is perfectly air-tight. It is best described by aid of the accompanying drawings, in which—

Figure 1 is a sectional elevation of the valve on an enlarged scale; Fig. 2, the upper part of the same; Fig. 3, a sectional elevation of the cap.

In the drawings, A is the usual screwed tube fitted into a hole in the inflatable tube or tire.

B is a flange which is usually used in conjunction with lock-nut C for holding the tube firm in the air-chamber and preventing leakage, the tube A being passed through a tight-fitting hole in the air-chamber, which is temporarily expanded to allow of the insertion of the flange of tube A.

D is the usual nut for screwing down onto the rim. There is nothing new in this part of the apparatus. Screwed into tube A with an internal screw at E is the port-tube F. This is held tight on tube A by means of washer G. In tube F is a valve-seat H, through which an eccentric hole I is passed. In tube F is a hole J, used for deflation, for by unscrewing tube F sufficiently hole J becomes exposed and allows of deflation.

K is a ball filling the mouth of port I.

L is a sloping slot in tube F, in which works a pin M, attached to an interior tube or plug N. This plug has a screw-thread O upon it and forms the nipple to which the pump is attached in the ordinary manner. It has a wide port P, having an eccentric port Q. This eccentric port and the eccentric port I are so placed that by turning the plug N around until the pin M comes to the other end of the slot L these two ports I and Q come opposite each other, while at the same time, owing to the slight obliquity of the slot L, the bottom of plug N comes firm against the valve-seat H, thus preventing any possible escape of air between plug N and tube F.

R is the usual cap.

S is a bar in tube F for the purpose of preventing ball K from falling out into the air-chamber.

The mode of action is as follows: The tube A being fixed in the air-chamber and passing through the tire and screwed down in the usual manner, tube F is firmly screwed down into it as far as it will go, pressing the washer G tight, and thus making an air-tight joint. Plug N is now turned until the ports I and Q come opposite each other. The pump is now screwed onto plug N and the tire inflated. The inflation being made and the tire being placed so that the valve shall be at its lowest point, the pump is unscrewed and the ball K is at once forced up against its seat and closes the port I. The plug N is now turned around as additional security, so as to place the two ports out of register with each other, and the inflation is completed. For deflating, the tube F, by means of the milled collar T, is unscrewed from tube A until the hole J is exposed.

In thus describing my invention it is obvious that the slot L can be horizontal, its main object being to form an abutment with the pin M, so as to insure that the two passages I and Q come exactly opposite each other and that when the pin is at the opposite end of the slot they shall be clear of each other. It is an additional safeguard, however, having it sloping, as by this obliquity the plug can be tightened against the valve-seat H, either when the two ports are opposite each other or at the other end of the movement, as desired. It is also obvious that the cap R could be arranged on a similar size to fit direct on the nipple or tube H instead of on the tube F. It is, however, preferable on tube N, so as to still further prevent the escape of air between the tubes N and F.

In the drawings tube F is expanded at the bottom after it is screwed in the tube A. This is to prevent it from being screwed out entirely and lost.

I declare that what I claim is—

1. In an inflating-valve for pneumatic cushions and tires, the combination with a rigid tube fixed air-tight in the cushion or tire, of another rigid tube screwed into the first named in an air-tight manner, this last-named, inner tube having at its middle a valve-seat with a restricted passage through it, the opening at the outer end of said passage being at one side of the axis of the tube, an elastic ball-valve adapted to close the inner end of said passage by pneumatic pressure, and a guard to prevent the escape of said ball, substantially as set forth.

2. In an inflating-valve for pneumatic cushions and tires, the combination with a rigid tube adapted to be fixed in the cushion or tire in an air-tight manner, of another rigid tube fixed in the outer end of that first named in an air-tight manner, said last-named tube having a double-faced valve-seat in its interior with a contracted, oblique, port or passage through it, a valve controlling the inner end of said port, and a hollow nipple or plug rotatively fitted in the outer end of the last-named tube, said nipple having a valve at its inner end to fit the outer valve-seat and a port in said valve which is at one side of the axis of the nipple and in position to be put in register with the port in the seat by rotation of the nipple, substantially as set forth.

3. The combination with a valve-seat H, having an oblique port I, of a plug N, having an oblique port Q and a pin M, a tube F, having an oblique slot L so arranged that at one end of the stroke of the pin M the two ports shall be brought to register, and at the other end of the stroke the plug N shall come down tight onto the valve-seat H, substantially as set forth.

In witness whereof I have hereunto signed my name, this 26th day of February, 1898, in the presence of two subscribing witnesses.

E. P. L. HARDY.

Witnesses:
GEORGE C. DYMOND,
ALBERT C. B. HENRI.